Figure 1:
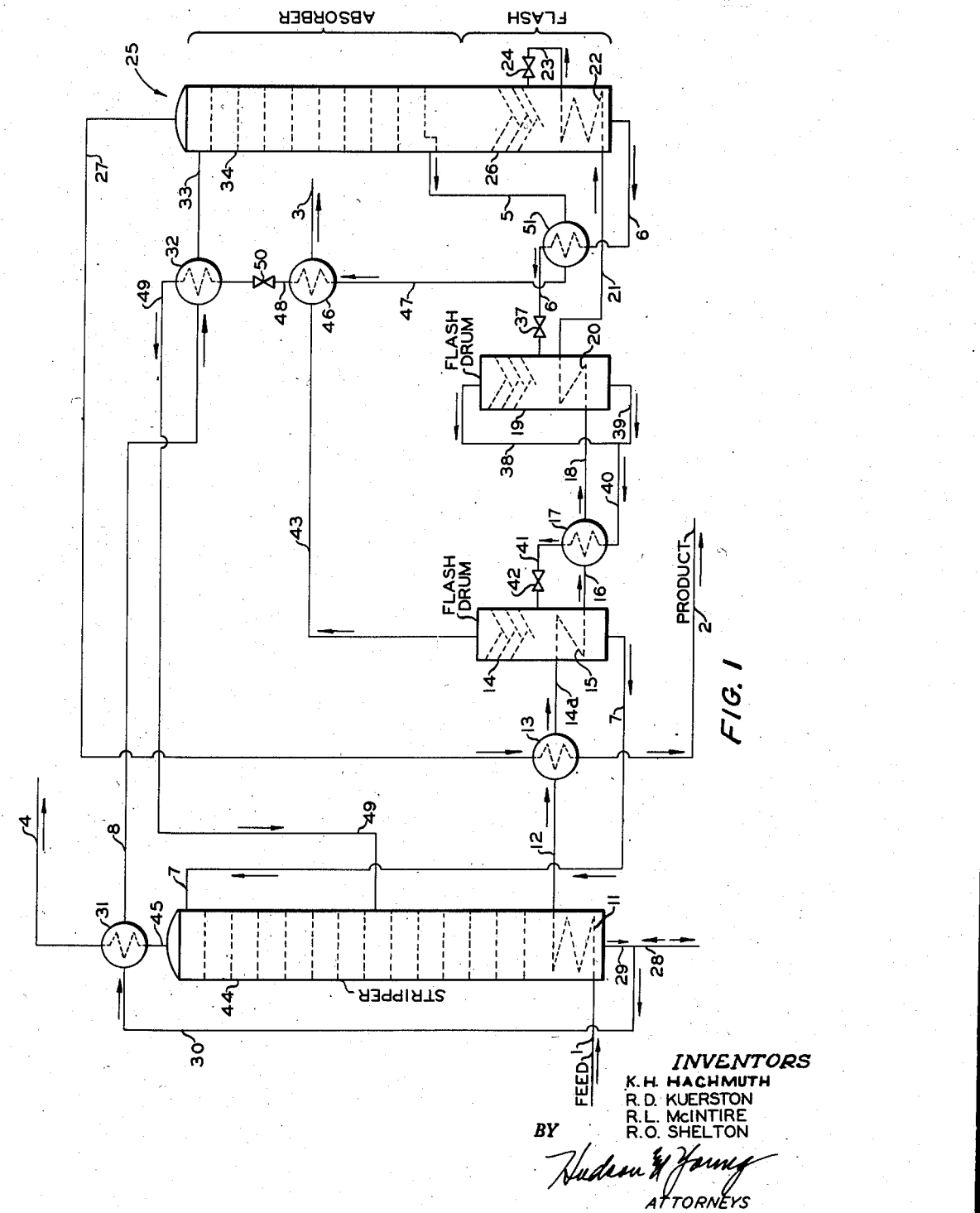

March 11, 1958     K. H. HACHMUTH ET AL     2,826,266

REMOVAL OF $CO_2$ FROM NATURAL GAS

Filed July 30, 1956     2 Sheets-Sheet 1

INVENTORS
K. H. HACHMUTH
R. D. KUERSTON
R. L. McINTIRE
R. O. SHELTON
BY

ATTORNEYS

United States Patent Office 2,826,266
Patented Mar. 11, 1958

2,826,266

REMOVAL OF CO₂ FROM NATURAL GAS

Karl H. Hachmuth, Richard D. Kuerston, Robert L. McIntire, and Russell O. Shelton, Bartlesville, Okla., assignors to Phillips Petroleum Company, a corporation of Delaware Application July 30, 1956, Serial No. 601,062

19 Claims. (Cl. 183—114.6)

This invention relates to the treatment of hydrocarbon gases. In one aspect it relates to a method or process for removing carbon dioxide from admixture with a gas comprising methane. In another aspect it relates to a method for removing carbon dioxide from a carbon dioxide containing hydrocarbon gas. In still another aspect it relates to a process for removing carbon dioxide from a natural gas containing carbon dioxide thereby upgrading the natural gas in heating value.

This application is a continuation-in-part of our application, Serial Number 396,114 filed December 4, 1953, now abandoned.

It has been found that some natural gases as produced contain appreciable amounts of such impurities as carbon dioxide, nitrogen and hydrogen sulfide. A gas containing as much as 10 to 20 percent of one or more of these impurities presents serious considerations when marketing is contemplated. The presence of carbon dioxide and nitrogen lowers the heating value of the gas merely by their presence while such a material as hydrogen sulfide causes the gas to be corrosive and to possess a foul odor. Combustion products of the latter also possess a disagreeable odor as well as being corrosive especially when moist. Since hydrogen sulfide is poisonous, and sulfur containing gases are not suitable for metallurgical purposes, the removal of hydrogen sulfide from natural gas to be used in domestic heating, and metallurgical process work is imperative.

Carbon dioxide and nitrogen affect a natural gas, for the most part, only by dilution since both these materials are substantially inert in a combustion zone. Transportation of natural gas containing such inerts by pipe line presents many problems, especially when economics are considered. For example when transporting say 100,000,000 cubic feet per day of a gas containing 10 percent by volume of carbon dioxide through a long pipe line, the operation involves repeated compression of 10,000,000 cubic feet of inert gaseous material. In addition, the construction of the pipe line with a capacity 10 percent greater than would be otherwise necessary increases markedly the capital investment. The cost of repeated compressions can amount to hundreds of thousands of dollars per year and the additional cost of the pipe line may be greater than the cost of a plant to remove the carbon dioxide. In addition, the diluting effect of such a gas naturally lowers the heating value, as for example, of a gas having a calorific value of say 1050 B. t. u. to approximately 945 B. t. u. When a contract specification requires a natural gas of 1000 B. t. u. it is obvious that the presence of an appreciable amount of carbon dioxide will lower the heating value to such an extent that the gas will not meet the required specification without processing for carbon dioxide removal. In addition, if the gas is a wet gas, that is, one containing condensable hydrocarbons, it may be that these condensable hydrocarbons cannot be extracted without lowering the B. t. u. values too far when such carbon dioxide is present or if the gas is a naturally lean gas the presence of appreciable carbon dioxide may cause the gas to fail to meet heating requirement specifications. In such a case higher B. t. u. materials, such as ethane and propane, may have to be added to offset the dilution effect of the inert gas.

It is suggested that a natural gas having a relatively high carbon dioxide content be treated for removal of this inert gas thereby "upgrading" the heating value. In case such a gas contains hydrocarbons of the gasoline boiling range or is "wet," as termed by the art, the condensable hydrocarbons may at least in part be extracted from the gas in the form of natural gasoline and upon substantial removal of the inert carbon dioxide still leave a natural gas of sufficiently high or satisfactory calorific value.

It is an object of this invention to provide a process for removal of relatively large amounts of carbon dioxide from admixture with a gas comprising methane.

Another object of our invention is to provide a process for the removal of relatively large amounts of carbon dioxide from a dry natural gas.

Yet another object of this invention is to provide a process for the simultaneous removal of inert carbon dioxide and extraction of condensable gasoline boiling range hydrocarbons from a natural gas containing these materials.

Yet another object of this invention is to provide a process for the simultaneous removal of carbon dioxide and extraction of condensable hydrocarbons from a natural gas containing these materials and still leave a natural gas of sufficiently high calorific value and without substantial loss of the main component of the treated gas.

Still other objects and advantages will be apparent to those skilled in the art from a careful study of the following disclosure which taken with the attached drawing respectively describes and illustrates a preferred embodiment of this invention.

In the drawing, Figure 1 illustrates in diagrammatic form an arrangement of apparatus parts for carrying out the process of this invention.

Figure 2:
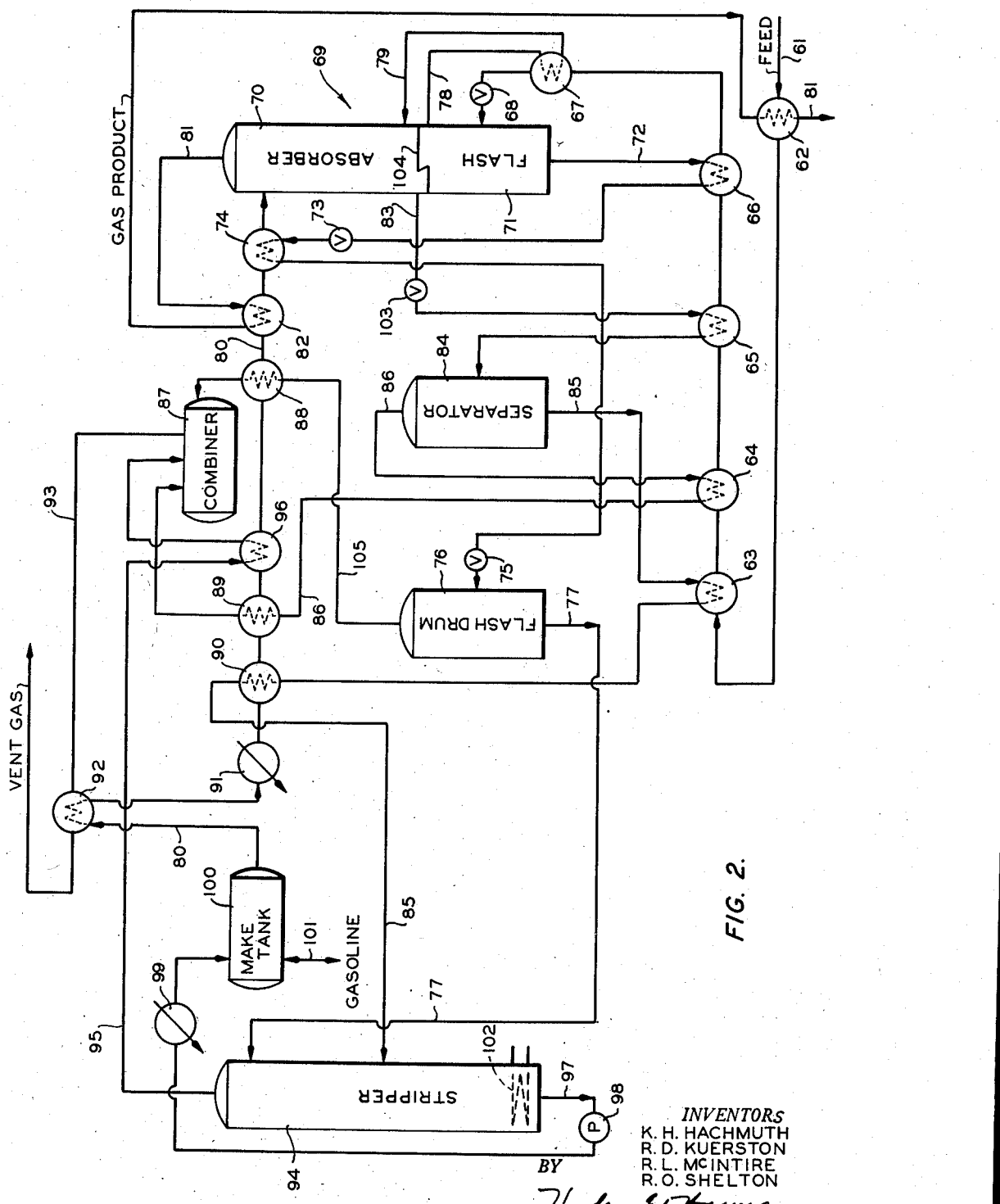

Figure 2 illustrates in diagrammatic form another arrangement of equipment for carrying out the process of this invention.

Broadly speaking, this process involves treating a carbon dioxide containing natural gas in an absorption operation with an absorbent hydrocarbon liquid such as a natural gasoline, in a combined flashing and absorption operation under such pressure and temperature conditions that a portion of the carbon dioxide content of the gas is condensed along with condensable hydrocarbons or is frozen out of the gas as a solid carbon dioxide phase while a substantial portion of the carbon dioxide not separated in this manner is removed from the gas by absorption. Following the original flashing operation condensate containing a higher concentration of carbon dioxide than the feed stock gas is flashed in at least one additional flashing operation for providing refrigeration for cooling the feed stock to the process and for ultimately removing a substantial portion of the carbon dioxide. Liquid remaining from the flashing operation and liquid absorbent containing dissolved carbon dioxide are introduced into a stripper in which further carbon dioxide is removed thereby leaving the absorption medium substantially free of carbon dioxide. If the carbon dioxide containing natural gas is a so-called "dry" gas, absorbent will need to be supplied for operation of the process and occasional makeup absorbent will be needed. In case the natural gas being treated is a "wet" gas the process can be operated without use of extraneous absorbent by utilizing natural gasoline produced in the process as the absorbent. In this latter case, if sufficient condensable hydrocarbons are present in the raw gas undergoing treatment, a natural gasoline is produced in excess of the absorption requirements and this excess is then removed as an additional product of the process.

Referring now to Figure 1 of the drawing, we will explain the operation of the process of this invention using as an example a natural gas containing about 70 volume percent methane, 28 volume percent carbon dioxide and 2 volume percent of ethane and higher boiling hydrocarbons. Such a gas at about 1600 p. s. i. a. (pounds per square inch absolute) is introduced from a source, not shown, through a line 1 into a heat exchange coil 11 in the bottom of a stripper column 44. The gas in pipe 1 is at substantially atmospheric temperatures, which for exemplary purposes, is taken as 100° F. The feed gas issues from the heat exchanger 11 at about 90° F. and is passed through a line 12 into a heat exchanger 13 in which the gas is cooled to about 0° F. This cooled gas leaves exchanger 13 at about 0° F. by way of a line 14a and is passed on into another heat exchanger 15 in the lower portion of a flash vessel 14. The gas is cooled in exchanger 15 to about −30° F. and is passed by way of a line 16 to still another heat exchanger 17 in which the gas is cooled on down to a temperature of about −45° F. The chilled gas at this latter temperature is transferred by way of a line 18 into still another heat exchange coil 20 in another flash vessel 19 in which the gas is cooled to about −55° F. From exchanger 20 the gas is passed to still another heat exchanger 22 in the lower portion of a vessel 25 in which the gas is chilled to about −60° F. The gas at this very low temperature is passed through a line 23 and through a pressure reducing valve 24 and is discharged into a flash section 26 of the vessel 25. Upon undergoing expansion through pressure reducing valve 24 the feed material is cooled to about −85° F. under which low temperature a considerable proportion of the carbon dioxide freezes out as solid carbon dioxide. In addition a further amount of liquid hydrocarbons is formed. The solid carbon dioxide and any liquid hydrocarbons present at this point drop to the bottom of the flash section 26 and the depth of liquid therein is maintained at such a point as to completely submerge the heat exchanger coil 22. Since the feed material enters coil 22 at about −55° F., sufficient heat is added to the liquid in the bottom of flash chamber 26 to melt the solid carbon dioxide, and the carbon dioxide dissolves in the liquid hydrocarbons to form a homogeneous solution. The carbon dioxide not frozen in this pressure reduction operation and other uncondensed gas pass upward from the flash section 26 into an absorber section 34 of vessel 25. A liquid hydrocarbon absorption medium, such as gasoline, is introduced into the absorber section 34 by way of a pipe 33 at the top of the vessel. The gasoline on flowing downward over liquid-vapor contacting apparatus absorbs an appreciable proportion of the carbon dioxide from the upflowing gases and the gasoline with its charge of absorbed carbon dioxide and hydrocarbons is removed from the absorber section 34 by way of a pipe 5. The pressure of the chilled feed material in pipe 23 is obviously somewhat lower than the feed pressure of 1600 p. s. i. a. in pipe 1 due to pressure loss on passage through the several heat exchangers and pipes. On passing through the pressure reducing valve 24 pressure on the feed is reduced to about 600 p. s. i. a. The absorbent gasoline with its charge of dissolved gases is removed as mentioned through pipe 5 and is cooled in a heat exchanger 51 from about −40° to −50° F. This so-called rich absorbent is withdrawn from exchanger 51 at said temperature and is passed through a pipe 47 to a heat exchanger 46 in which it is further cooled to about −56° F. Liquid at this temperature is transferred from the exchanger 46 through a pipe 48 to an expansion valve 50 in which the pressure is reduced from about 600 p. s. i. a. to about 100 p. s. i. a. On undergoing this pressure reduction tempertaure drops from about −56° F. to about −73° F. and at this latter temperature the absorbent passes through a heat exchanger 32 and on through a pipe 49 into the stripper vessel 44. On passing through the exchanger 32 the very cold absorbent is warmed up to a temperature of about 0° F. and simultaneously cools liquid flowing through a line 8 from about +90° F. to about −60° F. At this latter temperature the gasoline is passed on through line 33 into the upper portion of the absorber 34 as the absorbent.

Liquid condensate containing dissolved carbon dioxide is withdrawn from the lower portion of the flash section 26 of vessel 25 and is passed by way of a line 6 to the heat exchanger 51 in which this liquid is warmed to about −60° F. At this low temperature the condensate, removed from the exchanger 51 through pipe 6, is passed through a pressure reducing valve 37 into the flash vessel 19 which is maintained at a pressure of about 300 p. s. i. a. This pressure reduction results in a cooling to about −90° F. at which temperature carbon dioxide freezes. The frozen carbon dioxide and liquid condensate hydrocarbon drops to the bottom of vessel 19 and this liquid and solid carbon dioxide undergo heat exchange with material in coil 20 and the carbon dioxide is melted and remains in solution in the condensate. That portion of the carbon dioxide not frozen and not retained in the liquid is withdrawn from the top of the flash vessel 19 by way of a pipe 38 while the liquid is removed therefrom by way of a pipe 39. The liquid and gas are run together and passed through a pipe 40 into an exchanger 17. In this exchanger the condensate and gas are further heat exchanged and their temperature increased to about −40° F. At this temperature the condensate and gas are removed from exchanger 17 by way of a pipe 41. This material is then passed through a pressure reducing valve 42 into the flash vessel 14 maintained under a pressure of about 100 p. s. i. a. On undergoing this pressure reduction the gasoline and carbon dioxide are again chilled to about −90° F. and at least a portion of the carbon dioxide again freezes to a solid. Liquid condensate containing solution carbon dioxide and solid carbon dioxide are heat exchanged with feed material in heat exchanger 15 and solid carbon dioxide again melts and also dissolves in the liquid condensate. That portion of carbon dioxide and hydrocarbon which remains as gas in flash vessel 14 is removed therefrom and is passed by way of a pipe 43 into the heat exchanger 46 in which the temperature of the gas is raised from about −90° F. to about −60° F. This gas contains a high concentration of carbon dioxide and is removed from the system by way of a pipe 3 as one of the products of the process. In general, it is a waste product excepting for its low temperature because of its high carbon dioxide content.

Liquid in flash vessel 14 is passed through a pipe 7 into the upper portion of the stripper vessel 44. Thus, gasoline condensate containing carbon dioxide in solution is introduced into the stripper through the line 7 and rich absorbent gasoline containing dissolved carbon dioxide is introduced thereinto through the line 49 and these two materials being relatively high in carbon dioxide content constitute the feed stock to this stripper. Heat for stripping the dissolved carbon dioxide from liquid in the heat exchanger 11 is supplied by the original feed stock to the process flowing through this exchanger. This stripper column is provided with such vapor-liquid contacting apparatus as bubble cap trays or other suitable vapor-liquid contacting apparatus as will provide efficient contacting of the upflowing vapor and downflowing liquid at the pressure and temperature conditions maintained in this column. Overhead gases rich in carbon dioxide are removed from the stripper and are passed through a pipe 45 through a heat exchanger 31 and leave the system by way of the pipe 4 for such disposal as desired. This overhead gaseous product flowing through pipe 45 furnishes the first step of cooling applied to the lean absorbent. Lean absorbent from the bottom of the stripper is removed therefrom and is passed through a line 29, a line 30, through the heat exchanger 31 and on through the pipe 8, heat exchanger 32, and pipe 33 into the absorber section 34 of vessel 25. On passing through heat exchanger 31 the absorbent is cooled from about 85° F. to about 75° F. and on passage through exchanger 32 is it further cooled to about —60° F. prior to introduction into the absorber.

Overhead gases containing largely methane and the carbon dioxide which is not absorbed in the absorber is passed at about —40° F. from the top of the absorber through a line 27 into the heat exchangeer 13. In this heat exchanger this overhead gas is warmed to about 70° F. and it is passed from this exchanger through a line 2 as a main product of the process. This last heat exchanger 13 employs said overhead gas at about —40° F. to impart at least a portion of the initial cooling to the carbon dioxide-containing gas feed stock.

A line 28 is provided as shown for the addition of liquid absorbent for starting up the process in case it is desired to start up the process with the use of an absorbent from an extraneous source. If, however, it is desired to use gasoline produced in the process when treating wet natural gas then pipe 28 will be used to remove excess of gasoline as produced over that required in the absorption operation. When treating a dry gas, that is, one containing little or no gasoline boiling range hydrocarbons, it is not only necessary to employ extraneously produced gasoline, for example, through pipe 28 but it will be necessary to introduce makeup gasoline through this line as required for maintaining the proper quantity of absorbent gasoline in the process.

As an example of the operation of the process of Figure 1 the following tabulation is given illustrating the composition of materials at several process points.

| | Feed | Make Gas | Off-Gas | | Intermediate Products | | | |
|---|---|---|---|---|---|---|---|---|
| Line | 1 | 2 | 3 | 4 | 5 | 6 | 7 | 8 |
| $CH_4$ mols | 70 | 59 | 6 | 5 | 5 | 6 | 0 | |
| $CO_2$ mols | 28 | 1 | 13 | 14 | 10 | 17 | 4 | |
| $C_2+$ mols | 2 | 1.3 | 0.7 | 0 | 24 | 2 | 1 | 25 |
| Total mols | 100 | 61.3 | 19.7 | 19 | 39 | 25 | 5 | 25 |

In the table the first horizontal line contains the reference numerals as employed in the drawing to identify certain pipes or lines containing materials in process, the composition of which are given. Thus, from the analysis given in line 1 the gas undergoing treatment is seen to contain 70 volume percent methane, 2 volume percent of ethane and higher boiling hydrocarbons and 28 volume percent $CO_2$. Since the number of mols given in the feed gas column (1) totals 100 these values may be taken as the mol percent or as the number of mols of the several constituents per 100 mols of feed. There is accordingly only 1 mol of carbon dioxide which escapes the absorber in the gas product in line 2. It will be further observed that the stream in line 3 which is the flashed gas product from the flash vessel 14 contains 13 mols of $CO_2$ which is about 65 volume percent $CO_2$. The carbon dioxide content of the material removed from the top of the stripper 44 and being withdrawn from the process in line 4 contains 14 mols of $CO_2$ and 5 mols of methane, representing slightly over 73.5 volume percent $CO_2$. Since the two streams, that is, those flowing through pipes 3 and 4 contain such high percentages of $CO_2$ they may be, if desired, combined. It should also be observed that the rich absorbent being removed from the absorber 34 through pipe 5 contains ten mols of carbon dioxide per hundred mols of feed stock while the condensate removed from the bottom of the flash section 26 through pipe 6 contains 17 mols of $CO_2$ per hundred mols of feed stock. The liquid remaining in the final flash operation in vessel 14 is removed therefrom and passed through line 7 into the stripper vessel 44 and this material contains 4 mols of carbon dioxide per hundred mols of feed stock. This liquid in pipe 7 contains 80 percent carbon dioxide. The rich absorbent liquid mentioned above as being withdrawn from absorber 34 through line 5, is passed on through lines 47, 48 and 49 and finally is introduced into the stripper. This liquid contains, as mentioned above, 10 mols of $CO_2$, i. e. about 25.6 mol percent $CO_2$. This latter stream containing the lesser percentage of carbon dioxide is introduced part way down the stripper onto a tray on which liquid has about that composition.

The pressures and temperatures discussed herein are used when processing a feed stock of the herein given composition and the operation is found to be satisfactory. It will be realized by those skilled in the art that a gaseous feed stock containing other concentrations of $CO_2$, and other concentrations of ethane and higher boiling hydrocarbons will require somewhat different temperatures and pressures at the various process points. In addition, if the feed stock is available at for example 1400 p. s. i. a. or at higher pressures than the herein disclosed 1600 p. s. i. a. it is obvious that presures and temperatures at various process points will be different. Such a pressure as that herein disclosed (1600 p. s. i. a.) is sufficiently high that by employing ample heat exchangers sufficient refrigeration is supplied to carry out our process.

We employ two flash steps, as in flash vessels 19 and 14, for heat utilization purposes. It should be noted that a heat exchange coil is provided in the bottom of each of these flash vessels and a further heat exchanger is employed for utilizing available refrigeration from the 300 pounds fluid flowing through pipe 40 prior to the further pressure reduction step through valve 42. The use of a countercurrent heat exchange operation in exchanger 17 is desired because it is more efficient than the heat exchangers used in vessels 19 and 14 since in a countercurrent exchanger there is positive flow of fluid on both sides of the heat exchange tubes while in the exchangers 15 and 20 there is positive flow of fluid only within the exchangers.

In Figure 2, which illustrates for exemplary purposes another embodiment of our invention, feed stock material comprising a natural gas containing carbon dioxide, which can be similar to or different from the gas described relative to Figure 1, is introduced into the system in a pipe 61 from a source, not shown. This gas passes through heat exchangers 62, 63, 64, 65, 66 and 67 and then passes through a pressure reducing valve 68. For exemplary purposes the feed gas pressure to the system is taken as about 1600 p. s. i. a. (pounds per square inch absolute) and the temperature at about 100° F. On passing through the several heat exchangers the pressure of the feed gas becomes somewhat decreased but still is very high and on passing through valve 68 the pressure is reduced to a value of about 600 p. s. i. a. On passing through the heat exchangers the feed gas is cooled from about 100° F. to about —30° F. The pressure reduction through valve 68 reduces the gas temperature to about —75° F. At this low temperature condensable hydrocarbons are condensed to form a liquid gasoline which absorbs at least a portion of the carbon dioxide in the feed gas. That portion of the carbon dioxide not absorbed by the condensate remains in the gas phase with uncondensed hydrocarbons and the gas phase is removed from this flash vessel 71 through a pipe 78 and is passed through the heat exchanger 67 for imparting refrigeration to the feed stock. Effluent gas from heat exchanger 67 is passed through a pipe 79 into the lower portion of an absorber vessel 70 at a pressure of about 600 p. s. i. a. A gasoline, as an absorbent liquid, is introduced into the top of the absorber from a pipe 80 at a temperature of about —60° F. and flows downward and in countercurrent contact with upflowing gas. Separator 104 divides vessel 69 into the upper absorber 70 and the lower flash vessel 71. It is intended that this contacting or absorption operation be carried out at a very low temperature. The gas from pipe 79 enters absorber 70 at a temperature of about −23° F., the absorber gasoline enters at about −60° F.; but, since the absorption is an exothermic operation, absorbent gasoline containing absorbed carbon dioxide leaves the absorber through a pipe 83 at a temperature of about 0° F. This rich absorbent gasoline passes through a valve 103 with a reduction in pressure to about 200 p. s. i. a. accompanied by a drop in temperature. The thus cooled rich absorbent passes through heat exchanger 65 and becomes warmed therein to about 15° F. and passes on into a separator vessel 84. In this vessel gas rich in carbon dioxide is separated from the rich absorbent, the gas being withdrawn through pipe 86 and passed through exchanger 64 and exchanger 89 into an accumulator or combiner tank 87. Gaseous contents of this tank have a temperature of about 41° F.

The liquid phase separated in separator 84 is withdrawn through a pipe 85 and is passed through a heat exchanger 90 which increases the temperature of the rich absorbent gasoline from the aforementioned 15° F. to about 50° F., the rich absorbent being passed on into a stripper vessel 94.

The condensate containing dissolved carbon dioxide in the flash vessel 71 is withdrawn through a pipe 72, is passed through heat exchanger 66 in which the temperature of the condensate is increased from about −75° F. to about −55° F. and through an expansion valve 73. On passing through valve 73 the condensate temperature is reduced to about −80° F. and the pressure from about 600 p. s. i. a. to 400 p. s. i. a. On passing through a heat exchanger 74 the temperature of the condensate is increased to about −25° F. and on passing through valve 75 into flash drum 76 the pressure of the condensate is reduced to about 200 p. s. i. a. at a temperature of about −60° F. Absorbent gasoline still containing solution carbon dioxide is removed from flash drum 76 and is passed through a pipe 77 into the upper portion of stripper vessel 94. On flowing downward in this stripper the flash drum liquid mixes with the rich absorbent gasoline from the absorber 70 and these combined materials are stripped of their carbon dioxide content by the heating action of a heat exchanger 102. Off gases from the stripper comprising carbon dioxide leave the vessel at about −55° F. and are conducted through a pipe 95 and through a heat exchanger 96 thence into combiner tank 87. The stripped gasoline from stripper 94 is passed through a pipe 97 by a pump 98 and through a heat exchanger 99 in which the stream is cooled with plant cooling water into a make tank 100. At least a portion of this gasoline in make tank 100 at a temperature of about 100° F. is passed through line 80 and through heat exchangers 92, 91, 90, 89, 96, 88, 82 and 74, and thence into the upper portion of absorber 70 as aforementioned absorbent gasoline. On passing through these several heat exchangers the absorbent gasoline is cooled to about −60° F.

In Figure 2 we have shown the absorber 70 and the flash vessel 71 as being contained in a single vessel 69. It is realized, however, that absorber 70 and flash vessel 71 can be separate vessels disposed in convenient locations within a plant, as desired.

Unabsorbed gas comprising methane and containing much less carbon dioxide than the feed gas to the process leaves absorber 70 through a pipe 81, the gas being passed through heat exchangers 82 and 62 for utilizing available refrigeration before being passed to storage, pipe line or other disposal as desired. A pipe 101 communicates with make tank 100 for introduction of absorbent gasoline into the system for starting up the system or for adding make-up absorbent gasoline when required. When a wet gas is processed in this equipment, the condensable components are condensed to form a natural gasoline and the gasoline so produced, not required in the absorption operation, is removed as one of the products of the process through pipe 101. The term, wet gas, as used throughout this specification and claims refers to a natural or plant hydrocarbon gas containing condensable hydrocarbons.

The flashed gas produced in flash drum 76 is passed through a pipe 105 and through the heat exchanger 88 into the combiner tank 87. Carbon dioxide-rich gas from three sources, that is, from flash drum 76, from the stripper 94, and from the separator 84, is passed into combiner tank 87 and is removed therefrom at a temperature of about 41° F. through a pipe 93 for such disposal as desired. On passing through heat exchanger 92 the gas is warmed up to a temperature of about 90° F. with the simultaneous imparting of some cooling to the stripped gasoline from the make tank 100.

In the foregoing description we have given numerous temperatures at various process points but to provide an overall picture of the operation according to Figure 2, the following general temperature effects should be helpful in obtaining a clear picture of this operation. Feed gas to the process at 100° F. reaches flash vessel 71 at −75° F. Gas from this vessel passes through absorber 70 and off-gas therefrom at about −60° F. is heat exchanged and leaves the system at a temperature of about 90° F.

Condensate from flash vessel 71 reaches flash drum 76 at about −60° F. Liquid from this flash drum passes to the stripper at about the same temperature.

Rich absorbent from absorber 70 leaves this vessel at about 0° F. and enters separator 84 at +15° F., liquid therefrom passes into the stripper at about 50° F. Gas from the separator passes through several heat exchange steps and enters the combiner at about 41° F. Flash gas from flash drum 76 also reaches the combiner tank at about 41° F.

In the embodiment according to Figure 2 it is intended that the feed gas, on passing through expansion valve 68, be condensed, at least in part, to a liquid condensate which contains solution carbon dioxide, the carbon dioxide not absorbed in the condensate remains in the uncondensed gas. Carbon dioxide is not frozen to solid in this vessel. Similarly, it is intended that on passage of this condensate through expansion valve 75 that carbon dioxide be not frozen to solid.

As an example of the operation of the process according to Figure 2, the following tabulation is given illustrating composition of materials at several process points:

|  | Feed | Make-Gas | Vent-Gas | Make-Gasoline |
| --- | --- | --- | --- | --- |
| Pipe | 61 | 81 | 93 | 101 |
| CH₄, mols | 70.16 | 59.25 | 10.91 | 0 |
| CO₂, mols | 28.00 | 1.00 | 27.00 | 0 |
| C₂+N₂ mols | 1.84 | 0.27 | 1.41 | 0.15 |
| Total mols | 100.00 | 60.52 | 39.32 | 0.15 |

It is noted that in this tabulation only a very small quantity of make-gasoline is produced. This small production of gasoline is the result of treating substantially a dry gas.

It is noted that vent-gas passing through pipe 93 of Figure 2 contains 10.91 mols of methane while the off-gas passing through lines 3 and 4 combined, of Figure 1, contains approximately eleven mols of methane. The vent-gas of Figure 2 and the vent-gases of Figure 1 contain 27 mols carbon dioxide with only one mol of carbon dioxide retained in the make-gas; the main product of the process. According to both embodiments, 27 mols out of 28 are separated from the feed gas and are passed from the system as waste products.

Various auxiliary equipment such as liquid level controllers, pressure regulators, valves, temperature and pressure indicating, recording and controlling devices have not been illustrated on the drawing nor described in the disclosure for purposes of simplicity. The need for such auxiliary equipment, its installation, uses and care are well understood by those skilled in the art. It should be obvious that all of the equipment herein mentioned which includes vessels, pipes, valves, etc. should be constructed of sufficiently heavy material as to withstand the pressures involved in such an operation. Materials should also be used which are adapted for use at the low temperatures employed and in the presence of corrosive materials in case such materials are present in the feed stocks.

Other gasoline boiling range hydrocarbons than natural gasoline, such as straight run gasoline hydrocarbons, straight run gasoline fractions and mixtures of such hydrocarbons and fractions are used for absorbing $CO_2$ from admixtures with $CH_4$ as herein disclosed. Cracked gasoline and frictions thereof are also used as $CO_2$ absorbents.

While the above flow diagrams have been described for illustrative purposes the invention is obviously not limited thereto.

We claim:

1. A method for upgrading the methane content of a natural gas containing carbon dioxide comprising contacting said natural gas with liquefied natural gasoline boiling range hydrocarbons at a temperature below normal atmospheric temperature and at a pressure above normal atmospheric pressure, from this operation recovering a residue gas of methane content higher than the methane content of the natural gas fed to the operation as the main product of the process and said liquefied natural gasoline boiling range hydrocarbons containing dissolved carbon dioxide, from this latter product separating the carbon dioxide from the liquefied natural gasoline boiling range hydrocarbons as another product of the process, returning the liquefied natural gasoline boiling range hydrocarbons freed of carbon dioxide to the contacting operation as the first mentioned liquefied natural gasoline boiling range hydrocarbons.

2. A method for upgrading the methane content of a natural gas feed stock containing carbon dioxide and natural gasoline boiling range hydrocarbons in addition to methane, comprising contacting said natural gas with liquefied natural gasoline boiling range hydrocarbons at a temperature below normal atmospheric temperature and at a pressure above normal atmospheric pressure, from this operation recovering a residue gas of methane content higher than the methane content of the natural gas fed to the operation as the main product of the process and said liquefied natural gasoline boiling range hydrocarbons containing dissolved carbon dioxide and at least a portion of the natural gasoline boiling range hydrocarbons from said natural gas feed stock, from this latter product separating the carbon dioxide from the liquefied natural gasoline boiling range hydrocarbons as another product of the process, dividing the liquefied natural gasoline boiling range hydrocarbons freed of carbon dioxide into two portions, returning one portion as the first mentioned liquefied natural gasoline boiling range hydrocarbons, and removing the other portion as another product of the process.

3. A method for upgrading the heating value of a hydrocarbon feed gas containing gasoline boiling range hydrocarbons and carbon dioxide as an impurity, said feed gas being at a superatmospheric pressure and at a subatmospheric temperature, comprising condensing gasoline boiling range hydrocarbons and carbon dioxide from gaseous hydrocarbons and carbon dioxide gas from said feed gas by reducing the pressure thereon to a lower superatmospheric pressure wherein the temperature of the pressure reduced material is lowered below the above mentioned subatmospheric temperature, stripping carbon dioxide from the condensed gasoline boiling range hydrocarbons as one product of this process, dividing the stripped gasoline boiling range hydrocarbons into two portions, removing one portion as a gasoline product of the process, contacting the other portion with the gaseous hydrocarbons and carbon dioxide gas resulting from the condensing operation, from this contacting operation separating hydrocarbon gas of upgraded heating value as a main product of the process and introducing the liquid gasoline boiling range hydrocarbons containing absorbed carbon dioxide resulting from said contacting operation into the above mentioned stripping operation.

4. In the process of claim 3 wherein the feed gas superatmospheric pressure is higher than about 600 pounds per square inch absolute.

5. In the proceess of claim 3 wherein the feed gas temperature is about −60° F.

6. A process for upgrading the heating value of a hydrocarbon gas containing carbon dioxide as an impurity, said gas being at a pressure above about 600 pounds per square inch absolute, comprising chilling said gas by reducing its pressure to about 600 pounds per square inch absolute in a pressure reducing operation whereby a liquid hydrocarbon condensate phase containing solution carbon dioxide and a hydrocarbon gas phase containing carbon dioxide are produced, removing the liquid hydrocarbon condensate phase containing solution carbon dioxide from this pressure reducing operation, contacting at said pressure of about 600 pounds per square inch absolute said hydrocarbon gas phase containing carbon dioxide with an absorbent gasoline as subsequently produced whereby carbon dioxide is absorbed by said gasoline, from this absorption operation removing hydrocarbon gas containing less carbon dioxide than the gas fed to the operation as the main product of the process, introducing said liquid hydrocarbon condensate phase containing solution carbon dioxide into a stripping operation whereby dissolved carbon doxide is stripped from the condensate as another product of the process, removing the absorbent gasoline with its charge of absorbed carbon dioxide from the contacting operation, introducing this removed absorbent gasoline with its charge of absorbed carbon dioxide into said stripping operation and returning the absorbent gasoline and said liquid condensate deleted of solution carbon dioxide from said stripping operation into said contacting operation as said absorbent gasoline as subsequently produced.

7. The method of claim 6 wherein the absorbent is a natural gasoline.

8. The method of claim 6 wherein the absorbent is a hydrocarbon liquid of gasoline boiling range.

9. A method for upgrading the heating value of a hydrocarbon feed gas containing carbon dioxide as an impurity and being at a superatmospheric pressure above about 600 pounds per square inch absolute, cooling said gas by a first heat exchange as subsequently defined, chilling the cooled gas in a second heat exchange operation as subsequently defined, further chilling this chilled gas by reducing its pressure to about 600 pounds per square inch absolute in a first pressure reducing operation whereby a liquid hydrocarbon condensate phase containing carbon dioxide and a hydrocarbon gas phase containing carbon dioxide are produced, chilling said feed gas with said liquid hydrocarbon condensate phase containing carbon dioxide as said second heat exchange operation, removing said liquid hydrocarbon condensate phase containing carbon dioxide from said second heat exchange operation, reducing the pressure of this removed liquid hydrocarbon condensate phase to a superatmospheric pressure below about 600 pounds per square inch absolute in a second pressure reducing operation whereby a second liquid condensate containing carbon dioxide is produced, heat exchanging said gas feed with said second condensate containing carbon dioxide as said first heat exchange operation, withdrawing heat exchanged condensate from said first heat exchange operation, withdrawing flash gases from said second pressure reducing operation as a carbon dioxide product of the process, passing this latter withdrawn condensate into a stripping operation whereby dissolved carbon dioxide is stripped from the condensate, contacting at said pressure of about 600 pounds per square inch absolute said hydrocarbon gas phase containing carbon dioxide with an absorbent gasoline as subsequently produced whereby carbon dioxide is absorbed by said gasoline, from this absorption operation removing hydrocarbon gas containing less carbon dioxide than the gas fed to the operation as the main product to the process, removing absorbent gasoline with its charge of absorbed carbon dioxide from said contacting operation and introducing same into said stripping operation, removing carbon dioxide from said stripping operation as another product of the process, withdrawing stripped combined absorbent gasoline and liquid condensate from said stripping operation, dividing this withdrawn material into two portions, removing one portion as another product of the process and returning the other portion to said contacting operation as said absorbent gasoline as subsequently produced.

10. The method of claim 9 wherein the absorbent is a natural gasoline.

11. The method of claim 9 wherein the absorbent is a hydrocarbon liquid of gasoline boiling range.

12. A method for upgrading the heating value of a hydrocarbon gas containing carbon dioxide as an impurity comprising cooling said gas by heat exchange with a coolant as subsequently produced, said hydrocarbon gas containing carbon dioxide and being at a pressure of about 1600 pounds per square inch, further cooling said gas by reducing its pressure to about 600 pounds per square inch absolute in a first pressure reducing operation whereby a liquid hydrocarbon phase, a solid carbon dioxide phase and a hydrocarbon gas phase containing carbon dioxide are produced, melting the solid carbon dioxide phase, removing the liquid carbon dioxide and liquid hydrocarbon phase from this latter operation, reducing the pressure in a second pressure reducing operation on the removed liquid carbon dioxide and hydrocarbon phase whereby carbon dioxide is again frozen, melting this latter frozen carbon dioxide, withdrawing melted carbon dioxide and liquid hydrocarbon, and a gas phase from this latter operation as one product of the process, the solid carbon dioxide produced in said pressure reducing operations being said coolant, countercurrently contacting at a pressure of about 600 pounds per square inch absolute the hydrocarbon gas phase containing carbon dioxide from the first mentioned pressure reducing operation with an absorbent gasoline as subsequently produced at a temperature between about —85° F. and —40° F. whereby the carbon dioxide is absorbed by said gasoline, from this operation removing said hydrocarbon gas containing less carbon dioxide than the gas fed to the operation as the main product of the process, also removing this latter mentioned gasoline containing absorbed dioxide, introducing same and the melted carbon dioxide and liquid hydrocarbon resulting from the second pressure reducing operation into a stripping operation whereby dissolved carbon dioxide is stripped from the gasoline as another product of the process, and returning gasoline from this stripping operation to the countercurrent contacting operation as said absorbent gasoline.

13. The method of claim 12 wherein the absorbent is a natural gasoline.

14. The method of claim 12 wherein the absorbent is a hydrocarbon liquid of gasoline boiling range.

15. A method for upgrading the heating value of a hydrocarbon feed gas containing carbon dioxide as an impurity comprising cooling said feed gas by heat exchange with a coolant as subsequently produced, said feed gas being at a pressure of about 1600 pounds per square inch absolute, chilling the cooled feed gas by reducing its pressure to about 600 pounds per square inch absolute in a pressure reducing operation thereby producing a liquid hydrocarbon condensate phase containing carbon dioxide in solution and a hydrocarbon gas phase containing carbon dioxide, removing the condensate phase from this pressure reducing operation, further reducing the pressure on the removed condensate phase in a flashing operation thereby producing a flashed gas phase comprising carbon dioxide and a flashed liquid phase, withdrawing the flashed liquid phase, withdrawing the flashed gas phase from the flashing operation as a portion of one product of the process, countercurrently contacting at said pressure of about 600 pounds per square inch absolute said hydrocarbon gas phase containing carbon dioxide from the first mentioned pressure reducing operation with an absorbent gasoline as subsequently produced thereby absorbing carbon dioxide in said gasoline, from this absorption operation removing unabsorbed hydrocarbon gas containing less carbon dioxide than the hydrocarbon gas fed to the operation as a main product of the process, from the absorption operation also removing absorbent gasoline containing absorbed carbon dioxide, introducing this gasoline containing absorbed carbon dioxide and the withdrawn flashed liquid phase into a stripping operation and therein stripping carbon dioxide therefrom, removing the stripped carbon dioxide as another portion of said one product of the process, removing the stripped liquid from the stripping operation and dividing the removed stripped liquid into two portions, returning one portion to the countercurrent contacting operation as said absorbent gasoline as subsequently produced and removing of the other portion as another product of the process.

16. The method of claim 15 wherein the absorbent gasoline is a natural gasoline.

17. The method of claim 15 wherein the absorbent is a hydrocarbon liquid of the gasoline boiling range.

18. A method for upgrading the heating value of a hydrocarbon feed gas containing carbon dioxide as an impurity comprising cooling said feed gas by heat exchange with a coolant as subsequently produced, said feed gas being at a pressure of about 1600 pounds per square inch absolute, chilling the cooled feed gas by reducing its pressure to about 600 pounds per square inch absolute in a pressure reducing operation thereby producing a liquid hydrocarbon condensate phase containing carbon dioxide in solution and a hydrocarbon gas phase containing carbon dioxide, removing the condensate phase from this pressure reducing operation, further reducing the pressure on the removed condensate phase in a flashing operation thereby producing a flashed gas phase comprising carbon dioxide and a flashed liquid phase, withdrawing the flashed liquid phase, withdrawing the flashed gas phase from the flashing operation as a portion of one product of the process, removing the hydrocarbon gas phase containing carbon dioxide from said chilling operation as said coolant as subsequently produced, removing said coolant as warmed hydrocarbon gas phase containing carbon dioxide from the first mentioned cooling operation, and countercurrently contacting at said pressure of about 600 pounds per square inch absolute said warmed hydrocarbon gas phase containing carbon dioxide with an absorbent gasoline as subsequently produced thereby absorbing carbon dioxide in said gasoline, from this absorption operation removing unabsorbed hydrocarbon gas containing less carbon dioxide than the hydrocarbon gas fed to the operation as a main product of the process, also removing absorbent gasoline containing absorbed carbon dioxide, introducing this gasoline containing absorbed carbon dioxide and the withdrawn liquid phase into a stripping operation and therein stripping carbon dioxide therefrom, removing the stripped carbon dioxide as a second portion of said one product of the process, removing the stripped liquid from the stripping operation and dividing the removed liquid into two portions, returning one portion to the countercurrent contacting operation as said absorbent gasoline as subsequently produced and removing of the other portion as another product of the process.

19. A method for upgrading the heating value of a hydrocarbon feed gas containing carbon dioxide as an impurity comprising cooling said feed gas by heat exchange with a coolant as subsequently produced, said feed gas being at a pressure of about 1600 pounds per square inch absolute, chilling the cooled feed gas by reducing its pressure to about 600 pounds per square inch absolute in a pressure reducing operation thereby producing a liquid hydrocarbon condensate phase containing carbon dioxide in solution and a hydrocarbon gas phase containing carbon dioxide, removing the condensate phase from this pressure reducing operation, further reducing the pressure on the removed condensate phase in a flashing operation thereby producing a flashed gas phase comprising carbon dioxide and a flashed liquid phase, withdrawing the flashed liquid phase, withdrawing the flashed gas phase from the flashing operation as a portion of one product of the process, removing the hydrocarbon gas phase containing carbon dioxide from said chilling operation as said coolant as subsequently produced, removing said coolant as warmed hydrocarbon gas phase containing carbon dioxide from the first mentioned cooling operation, and countercurrently contacting at said pressure of about 600 pounds per square inch absolute said warmed hydrocarbon gas phase containing carbon dioxide with an absorbent gasoline as subsequently produced thereby absorbing carbon dioxide in said gasoline, from this absorption operation removing unabsorbed hydrocarbon gas containing less carbon dioxide than the hydrocarbon gas fed to the operation as a main product of the process, also removing absorbent gasoline containing absorbed carbon dioxide, reducing the pressure on this removed absorbent gasoline containing absorbed carbon dioxide in a flashing operation thereby producing a gas phase comprising carbon dioxide and a residual liquid absorbent gasoline phase, removing this latter gas as a second portion of said one product of the process, introducing this residual liquid absorbent gasoline phase and the withdrawn liquid phase into a stripping operation and therein stripping carbon dioxide therefrom, removing stripped carbon dioxide as a third portion of said one product of the process, removing the stripped liquid from the stripping operation and dividing the removed liquid into two portions, returning one portion to the countercurrent contacting operation as said absorbent gasoline as subsequently produced and removing of the other portion as another product of the process.

References Cited in the file of this patent

FOREIGN PATENTS 152,771     Australia _____ Aug. 11, 1953

UNITED STATES PATENT OFFICE
CERTIFICATE OF CORRECTION

Patent No. 2,826,266                          March 11, 1958

Karl H. Hachmuth et al.

It is hereby certified that error appears in the printed specification of the above numbered patent requiring correction and that the said Letters Patent should read as corrected below.

Column 1, line 66, after "removal" insert a period; column 5, line 4, for "is it" read -- it is --; column 9, line 15, for "frictions" read -- fractions --; column 11, line 53, after "absorbed" insert -- carbon --.

Signed and sealed this 27th day of January 1959.

(SEAL)
Attest:

KARL H. AXLINE
Attesting Officer

ROBERT C. WATSON
Commissioner of Patents